J. WEAVER.
TIRE CHAIN.
APPLICATION FILED APR. 14, 1913.
1,080,394. Patented Dec. 2, 1913.
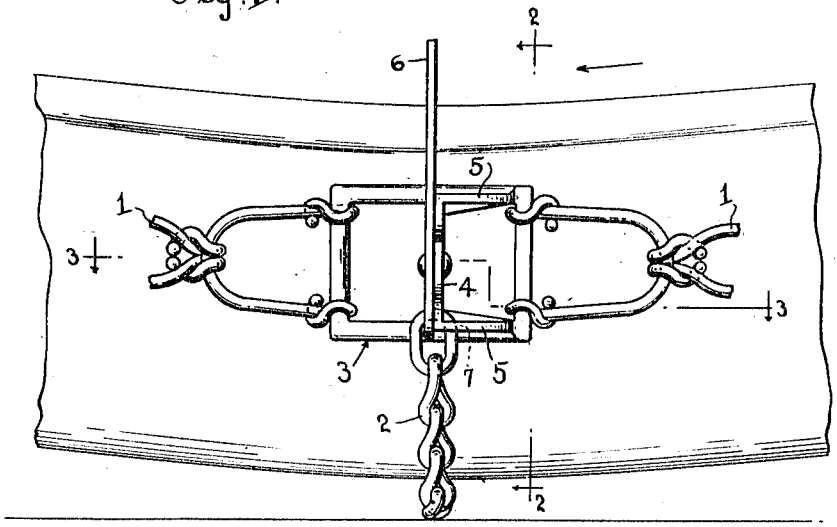
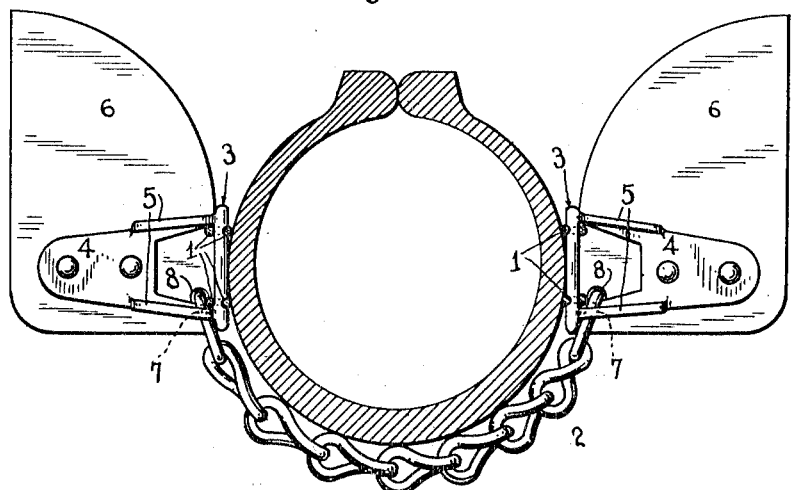
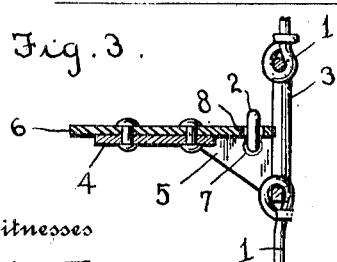
Inventor
Jesse Weaver
Witnesses

UNITED STATES PATENT OFFICE.

JESSE WEAVER, OF OAKLAND, NEBRASKA.

TIRE-CHAIN.

1,080,394.  Specification of Letters Patent.  Patented Dec. 2, 1913.

Application filed April 14, 1913. Serial No. 761,014.

*To all whom it may concern:*

Be it known that I, JESSE WEAVER, a citizen of the United States, residing at Oakland, in the county of Burt and State of Nebraska, have invented certain new and useful Improvements in Tire-Chains; and I do declare the following to be a full, clear, and exact description of the invention, such as will enable others skilled in the art to which it appertains to make and use the same.

This invention relates to improvements in tire chains for motor vehicle wheels.

One object of the invention is to provide a tire chain having an improved construction and arrangement of laterally projecting mud lugs whereby the wheel may obtain a firm grip in mud, snow or slush, thus preventing the wheel from slipping around without driving the vehicle.

Another object is to provide a mud lug for the chains of vehicle wheel tires which will not come into engagement with a hard road bed or surface over which the vehicle is passing and which will be simple, strong, durable and inexpensive in construction, efficient and reliable in operation and well adapted to the purpose for which it is designed.

With these and other objects in view, the invention consists of certain novel features of construction, and the combination and arrangement of parts as will be more fully described and claimed.

In the accompanying drawings: Figure 1 is a side view of a portion of an automobile tire showing a portion of my improved chain applied thereto; Fig. 2 is a cross sectional view thereof taken on the line 2—2 of Fig. 1; Fig. 3 is a detail longitudinal sectional view taken on the line 3—3 of Fig. 1.

Referring more particularly to the drawings, 1 denotes the attaching chains of the device which are applied to the opposite sides of the tire and to which the short tread chains 2 are secured. Arranged at suitable intervals and at equal distances apart in the chain 1 are lug supporting frames 3 which may be of any suitable shape and are here shown as being rectangular and as having formed thereon substantially midway between their ends laterally projecting lug attaching brackets 4, said brackets being held rigid by integral bracing webs 5 arranged between the rear side of the lugs and the adjacent outer sides of the side bars of the frames 3.

My improved mud lugs 6 are in the form of flat segmental plates which are riveted or otherwise rigidly secured to the brackets 4 near the lower edges of the plates with the curved edges of the latter projecting inwardly or toward the tire. When thus arranged the mud lugs or plates 6 will project laterally from the opposite sides of the tire with the lower edges of the lugs at substantially right angles to the tire and located a slight distance below the center of the latter or at a considerable distance above the tread or ground engaging portion thereof, so that when the wheel is passing over a smooth road bed or other hard surface the mud lugs will not be brought into engagement therewith. When, however, the wheel is passing through deep mud, snow or slush where it is difficult for the tire to obtain a firm grip and which will cause the wheel to slip around loosely without driving the vehicle, the lugs 6 will engage the mud or snow in a manner similar to that in which the paddles of a water wheel operate and will thus enable the wheel to obtain a firm grip or hold to propel the vehicle.

The short tread chain 2 may be of the usual or any approved construction and one of said chains is preferably employed in connection with each pair of mud lugs. The end links of the chains 2 are engaged with apertures 7 in the braces 5 of the lug attaching brackets 4 and with apertures 8 in the lugs 6 as clearly shown in the drawings thereby holding the chains in operative engagement with the tread of the tire, thus protecting the latter from slipping or skidding on wet or slippery surfaces.

From the foregoing description taken in connection with the accompanying drawings, the construction, and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

1. In a device of the character described, pairs of lug attaching chains adapted to be engaged with the opposite sides of a tire, a series of lug attaching frames secured in said chains, lug attaching brackets formed on said frames and projecting outwardly therefrom and laterally projecting mud lugs comprising plates secured to said brackets and having their lower edges disposed at right angles to the tire and spaced a suitable distance above the tread thereof.

2. In a device of the character described, a pair of side chains adapted to be engaged with the opposite sides of a tire, lug attaching frames secured in said chains, laterally projecting mud lugs secured to said frames, and short tread chains arranged around the tread of the tire and having their ends secured to said frames and mud lugs.

In testimony whereof I have hereunto set my hand in presence of two subscribing witnesses.

JESSE WEAVER.

Witnesses:
ARTHUR B. PEDEN,
HARRY E. STORM.

---

Copies of this patent may be obtained for five cents each, by addressing the "Commissioner of Patents, Washington, D. C."